Patented Nov. 4, 1941

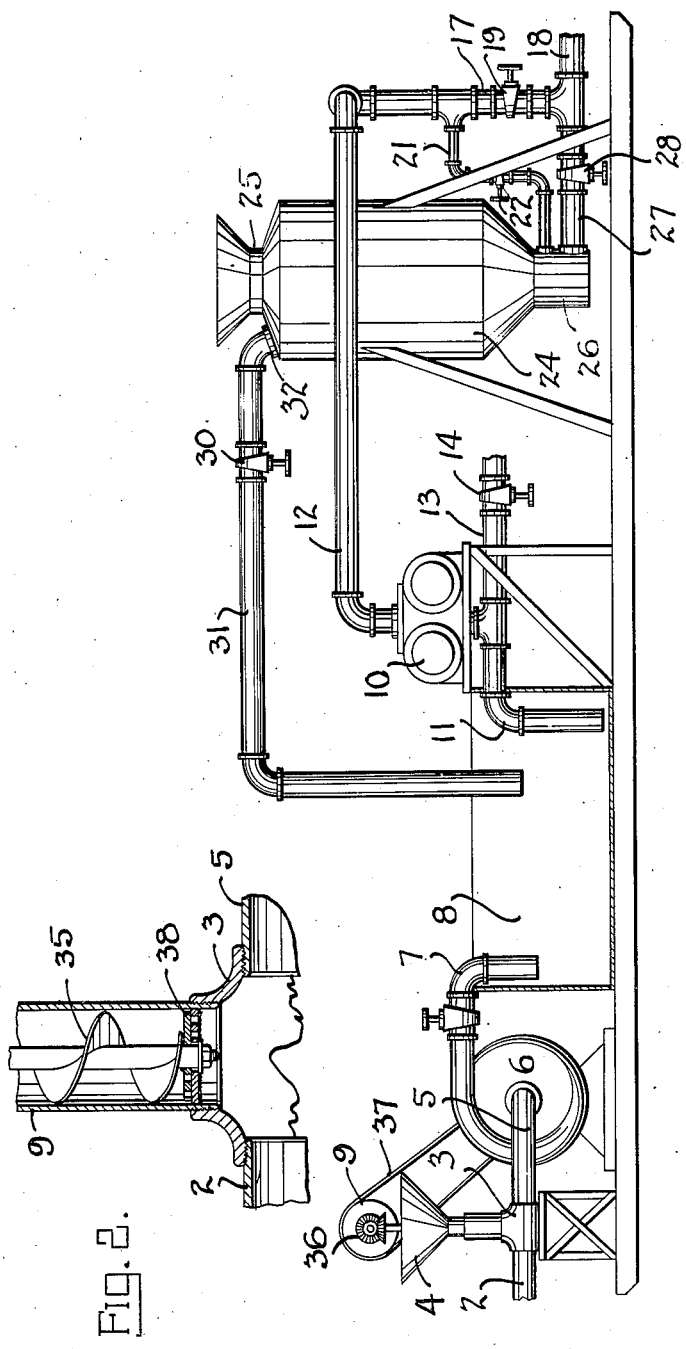

2,261,441

UNITED STATES PATENT OFFICE 2,261,441

CEMENTING MACHINE

Leslie A. Layne, Houston, Tex.

Application February 4, 1939, Serial No. 254,544

2 Claims. (Cl. 259—151)

The invention relates to a cementing machine and particularly that type of machine wherein cement or concrete is to be mixed and dumped under pressure to a point of application.

In attempting to mix cement and concrete and to then transfer such mixture under pressure, considerable difficulty has been encountered and particularly where granular material is to be added to the cement slurry.

The present apparatus contemplates that the cement slurry may be mixed and then the granular material added to the slurry after it has passed the pump so that an intimate mixture of the slurry and the granular material may be obtained.

It is also an object of the invention to introduce a cement slurry into a pressure drum where the slurry will pick up granular material and act as a carrier therefor.

Another object of the invention is to provide a cementing device wherein a mixture of cement and water is used as a carrier for the granular material and the final concrete mixture can be pumped under pressure to the point of application.

Another object of the invention is to provide an overflow or return line for cement slurry from a gravel pressure drum.

Other and further objects of the invention will be readily apparent when the following description is considered in connection with the accompanying drawing, wherein:

Fig. 1 is a side elevation.

Fig. 2 is a broken sectional view of the cement feeding device.

The drawing shows a side elevation of a diagrammatic arrangement of the equipment constituting the cementing device.

A pipe 2 is suitably connected to a source of water under pressure so that the water will pass thru the T connection 3 which is disposed beneath a hopper or funnel 4. Cement or other material which is to be used in mixing up the slurry may be introduced in this hopper and the flow of liquid thru the T 3 will pick up this dry material and carry it into the section 5 of the pump 6.

If desired a feeding device 9 for the material in the hopper 4 may be provided and is here shown as a screw 35 driven by the gear 36 from a belt 37 connected to a pump 10. As seen in Fig. 3 the plates 38 can be adjusted to control the rate of admission of the cement or other material. A centrifugal pump has been shown because it is intended that it may best serve the purpose to form a complete mixing of the cement and water which will discharge from the pipe 7 into a tank or reservoir 8. The pump 6 may be operated at such a speed as to maintain a body of the slurry in the reservoir 8.

The pump 10 has a section 11 extending into the reservoir and is arranged to pick up the slurry and force it thru the discharge 12 of the pump. A supply line 13 is shown as connected to the section 11 of the pump and is controlled by a valve 14 so that the slurry from the reservoir 8 may be diluted or other material added thru the pipe 13.

The discharge 12 from the pump 10 passes thru the pipe 17 to the transfer line 18 which leads to the point of application, and if desired, by opening the valve 19 on this line a direct flow may be had from the reservoir 8 to the point of application. When it is intended that granular material shall be added to the slurry, however, a by-pass line 21 controlled by the valve 22 may be opened so as to force a part or all of the flow of slurry from the pump 10 thru this by-pass line. This line is in turn connected to the pressure or gravel drum 24 which may be constructed to withstand any desired pressure. The top of this drum 24 has a closure which is disposed adjacent the neck 25 at the top. Granular material may be thus deposited in the drum and when pressure is applied to the drum by opening the valve 22, the drum will be completely closed and the inlet of liquid from the pipe 21 at the base 26 of the tank will serve to agitate the granular material and cause it to be picked up and carried along with the liquid which will discharge from the outlet 27 of the drum. A valve 28 on the outlet line serves to control the rate of discharge.

It seems obvious that by manipulation of the valves 19, 22 and 28, any desired proportion of the discharge from the pump 10 may be passed thru the gravel drum or directed around the gravel drum as desired. In this manner any desired proportion of granular material may be picked up by the flow of slurry. The mixing action will occur in the base of the drum 24 and in the pipe 27 and 18 so that a uniform mix will be obtained in this manner.

When it is desired to replenish the supply of granular material in the drum, it is only necessary to close the valves 22 and 28 and to open the valve 30 on the overflow or the return pipe 31 which is connected at 32 to the top of the gravel drum. When this valve 30 is open the pressure in the drum is relieved and the drum may be opened at the top. The pipe 31 leads into reservoir 8 so that when granular material is deposited in the drum, the liquid in the drum which is displaced will overflow into the reservoir and not be wasted. As soon as the drum is filled with granular material and is to be again used the valve 30 is closed and the valves 19, 22 and 28 manipulated as desired to again pick up a charge of granular material.

The usual practice is to have two of these drums 24 arranged side by side so that they may be used alternately to discharge one drum while the other drum is being filled.

Broadly the invention contemplates a cement mixing device with which it is possible to mix and transmit cement mix of any desired proportion.

What is claimed is:

1. A concrete mixer and conveyor including a centrifugal pump, means to feed water and cement thereto, a reservoir to receive the discharging cement slurry, a pressure container for granular material, a pump, a suction inlet therefor extending into said reservoir, a discharge therefor for the cement slurry picked up from said reservoir, a connection from said discharge to said container, an outlet from the container to said discharge, and valve means on said connection and said outlet so that the slurry may be passed through said container to pick up granular material and carry such material through said outlet.

2. A cementing device including means to mix the cement and water to form a slurry, means to pump the slurry to the point of application of the concrete, and means to add granular material to the slurry while the slurry is being pumped under pressure, said means including a pressure drum for granular material and connections to by-pass some of the slurry through said drum to pick up the granular material, and a line from said drum to return the slurry remaining in the drum to the suction of said pump when such slurry is displaced by recharging the drum with granular material.

LESLIE A. LAYNE.